(12) United States Patent
Sigg

(10) Patent No.: US 7,529,546 B1
(45) Date of Patent: *May 5, 2009

(54) METHOD AND APPARATUS FOR REMOVING A SECTOR FROM AN ACTIVE SET

(75) Inventor: Jason P. Sigg, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 613 days.

This patent is subject to a terminal disclaimer.

(21) Appl. No.: 11/265,405

(22) Filed: Nov. 1, 2005

(51) Int. Cl.
*H04B 7/00* (2006.01)

(52) U.S. Cl. ............... 455/436; 455/439; 455/522; 455/62; 455/525; 370/332

(58) Field of Classification Search .......... 455/517–525, 455/456.1–456.3, 69, 436–444; 370/310, 370/311, 318, 328, 331–332, 338–349
See application file for complete search history.

(56) References Cited

U.S. PATENT DOCUMENTS

| | | | | |
|---|---|---|---|---|
| 6,058,136 | A | 5/2000 | Ganesh et al. | 375/200 |
| 6,160,999 | A * | 12/2000 | Chheda et al. | 455/69 |
| 6,317,453 | B1 | 11/2001 | Chang | 375/140 |
| 7,050,804 | B1 | 5/2006 | Wurtenberger et al. | 455/436 |
| 7,076,265 | B2 * | 7/2006 | Tayloe et al. | 455/522 |
| 7,302,265 | B1 | 11/2007 | Chalishazar et al. | 455/439 |
| 2002/0049058 | A1 | 4/2002 | Tee | 455/437 |
| 2002/0119787 | A1 * | 8/2002 | Hunzinger | 455/516 |
| 2002/0142772 | A1 * | 10/2002 | Hunzinger | 455/436 |
| 2003/0186707 | A1 * | 10/2003 | Pihl et al. | 455/456.1 |
| 2003/0195017 | A1 * | 10/2003 | Chen et al. | 455/562.1 |
| 2005/0020203 | A1 * | 1/2005 | Losh et al. | 455/11.1 |
| 2006/0135173 | A1 | 6/2006 | Vannithamby | 455/453 |
| 2006/0159051 | A1 * | 7/2006 | English | 370/332 |
| 2006/0227744 | A1 | 10/2006 | Metke et al. | 370/331 |
| 2008/0076432 | A1 * | 3/2008 | Senarath et al. | 455/442 |

OTHER PUBLICATIONS

Scott Baxter, "Course 132 Technical Introduction to CDMA, *IS-95 CDMA and a few details of CDMA 2000 1X*", available at www.howcdmaworks.com (Feb. 2003).

Office Action mailed Oct. 16, 2008 in U.S. Appl. No. 11/265,433, filed Nov. 1, 2005.

* cited by examiner

*Primary Examiner*—Kamran Afshar

(57) ABSTRACT

Communication on a sector in a mobile station's active set is eliminated in order to test whether such elimination has a sufficiently adverse impact on RF communication with the mobile station on the remaining sectors in the active set. If it is determined that the elimination of the sector has a sufficiently adverse impact, communication on the sector is restored. Otherwise, the sector is removed from the mobile station's active set, thereby freeing up soft hand-off resources including a channel element and a Walsh code for use by other mobile stations. In one embodiment, if the mobile station seeks to add the removed sector back into its active set, the add-request is denied if the mobile station is stationary, but accepted if the mobile station is moving.

18 Claims, 8 Drawing Sheets

HISTORY

| EVENT | MSID | MS LOCATION | SECTOR REMOVED | ACTIVE SET MEMBERS | TEST RESULTS (ARRAY) | DATE/TIME |
|---|---|---|---|---|---|---|
| 1. | ___ | ___ | ___ | ___ | ___ | ___ |
| 2. | ___ | ___ | ___ | ___ | ___ | ___ |
| 3. | ___ | ___ | ___ | ___ | ___ | ___ |
| . | ... | ... | ... | ... | ... | ... |

FIGURE 9

| LOCATION BOUNDARY | SECTOR TO REMOVE |
|---|---|
| $[X_1, X_2, Y_1, Y_2]$ | $S_1, S_2, S_3$ |
| $[X_1, Y_1, R = 3\ \text{MILES}]$ | $S_1, S_5$ |
| $[X_3, X_4, Y_3, Y_4]$ | $S_8, S_9$ |
| ... | ... |

FIGURE 10

METHOD AND APPARATUS FOR REMOVING A SECTOR FROM AN ACTIVE SET

RELATED APPLICATION

This application is related to the application of Jason P. Sigg filed on the same date as this application, "Method and Apparatus for Removing Sectors from a Mobile Station Active Set Using History of Prior Removals" Ser. No. 11/265,433 filed Nov. 1, 2005, the contents of which are incorporated by reference herein.

BACKGROUND

A. Field

This disclosure relates generally to cellular wireless communication and more particularly to methods for efficiently allocating soft hand-off resources, including channel elements and Walsh codes, in one or more base transceiver stations. The disclosure further relates to methods for intentionally removing a sector from a mobile station's active set (and thereby freeing up soft hand-off resources) where such elimination does not have a significant adverse impact on communications between a mobile station and other sectors in the mobile station's active set.

B. Related Art

Cellular wireless communication is a technology which allows roaming mobile stations such as cellular telephones to make and receive telephone calls and exchange data with network entities. In the United States, a spread spectrum technology known as CDMA (Code Division Multiple Access) has been deployed. The CDMA technology is described in publicly available standards documents, including IS 95-A, and in standard reference textbooks.

The infrastructure for CDMA includes a network of cells having base transceiver stations, each having an antenna for communicating with a mobile wireless device via radio frequency (RF) communication. The cells are further divided into sectors. CDMA technology includes a feature providing for handoff for cellular wireless communication devices, i.e., facilitating transfer of a device from one wireless coverage area (e.g., cell sector) to another during a call. "Hard handoff" involves switching the device out of a first sector before switching the device to a new sector (i.e., break-before-make), which could result in dropped calls. "Soft handoff", which is the more preferred approach, involves switching the device to a new sector before switching the device out of the old sector (i.e., make-before-break), which allows for more seamless transfer of a communication session from one sector to another.

In a CDMA system operating according to the "1xRTT" ("1x") protocol, a mobile station maintains in its data storage a listing of sectors called its "active set," which may be provided by one or more base transceiver stations in the mobile station's area. Each sector has a respective Pseudo-Noise (PN) offset, and an assigned Walsh code, which are used as a basis to uniquely modulate signals transmitted in that sector. When the mobile station is engaged in a call (or other bearer communication), the mobile station actually listens to all of its active set sectors at once. Several alternative methods of combining or using the all the active set sectors are known. In one example, a mobile station combines the signals over time by picking the best one on a frame-by-frame basis. In another example, the mobile station picks the earliest arriving frame, provided it has a good cyclical redundancy check (CRC).

Communication between the mobile station and a sector in a base transceiver station is handled on the base transceiver side by a device known as a channel element. In some implementations, for a particular set of N sectors in an active set, N channel elements are employed. In other implementations, fewer than N channel elements are needed because they are shared across more than one sector. For a given mobile station, the channel elements need not be all located in a particular base transceiver station. For example, two channel elements acting as sectors in an active set could be located in one base transceiver station and another channel element could be could be located in a separate base transceiver station.

In addition to the "active set", a mobile station also maintains a list of "neighbor set" sectors, which are adjacent sectors to which the mobile station can theoretically hand off. In operation, the mobile station regularly receives and measures the strength of pilot signals on each of its active set sectors and each of its neighbor set sectors. If the received pilot signal power in a neighbor set sector exceeds a pre-defined threshold (called "$T_{ADD}$"), the mobile station then sends a Pilot Strength Management Message (PSMM) over the air to its serving base station controller (BSC), proposing a new active set for the mobile station to use. The new proposed set would be the old set, modified to add the neighbor sector and possibly delete an active sector. If the active set is full, a comparison between the requested neighbor and the lowest power active set member is conducted to see if a swap should occur. If the BSC approves of a change to the active set, the base transceiver station then sends a Handoff Direction Message (HDM) to the mobile station, directing the mobile station to begin using the new active set in place of the old active set. This is a soft handoff process, because the mobile station still continues to communicate on one or more sectors on which it was communicating before the handoff occurred.

As mobile cellular devices are typically battery operated devices with finite battery capacity, power management features are included in CDMA technology which are designed to minimize power consumption of a wireless device when communicating with a base transceiver station. However, transmit power levels from the mobile station have to be high enough that the base transceiver station can communicate with the mobile station without excessive error rates. Consequently, in a CDMA system a mobile station and base station regularly engage cooperatively in a power control process to control the power of bearer transmissions over the air interface.

Generally speaking, on the reverse link of the air interface (i.e., from the mobile station to the base transceiver station), the base transceiver station monitors the power of signals the base transceiver station receives from the mobile station and may direct the mobile station to transmit at a higher power level if the received power level is not high enough. Further, the base station will monitor the frame error rate (FER) of the signals that it receives from the mobile station and may direct the mobile station to transmit at a higher power level if the FER is too high. This power control is carried out in an "open loop" or a "closed loop" depending on the status of the call. The power control process is known in the art and further details are therefore omitted from the present discussion.

On the forward link, a somewhat similar process occurs. The mobile station will monitor the FER of signals that the mobile station receives from the base transceiver station, and the mobile station will report the FER to the base transceiver station. If the base transceiver station then determines that the mobile station's detected FER is too high, the base transceiver station will then increase its transmit power to the mobile station.

As noted above, a cellular base transceiver station contains a number of "channel elements," which are typically circuit cards that are arranged to support air interface communication. When a base transceiver station and mobile station are in communication in a particular cell sector, a channel element is dedicated for that communication. Thus, if a mobile station communicates at once on three active set sectors, up to three channel elements would be used for the communication, depending on whether channel elements were shared. Channel elements are a finite (and expensive) resource, and need to be managed in an efficient manner. Likewise, there are a finite number of Walsh codes that are available for modulating signals on sectors in a base transceiver station and there is a need in the art to more efficiently handling these soft hand-off resources as well.

Further background information on CDMA is set forth in the patent literature (see e.g., U.S. Pat. Nos. 6,317,453 to Chang and et al., 6,058,136 Gansesh), the relevant standards documents, and in web-based tutorials and downloadable resources, such as "Course 132 Technical Introduction to CDMA, *IS-95 CDMA and a few details of CDMA* 2000 1*X*", Scott Baxter (2003), available at www.howcdmaworks.com.

SUMMARY

The following embodiments and aspects thereof are described and illustrated in conjunction with systems, tools and methods which are meant to be exemplary and illustrative, not limiting in scope.

In a first aspect, a method is disclosed for managing communication between one or more base transceiver stations and a mobile station. The mobile station could be a cellular telephone, pager, Personal Digital Assistant, or other portable computing device. The communication between the one or more base transceiver stations and the mobile station occurs on or using an active set of cell sectors ("active set"). The method comprises the steps of:

a) intentionally eliminating communication between a base transceiver station and the mobile station on a selected sector in the active set;

b) determining the effect of the elimination on communication between the mobile station and at least one other remaining sector in the active set; and c) either restoring communication on the selected sector or removing the selected sector from the active set, based on the determination in step b).

Step a) may be performed by simply ceasing transmission in the sector or may be performed by transmission of a predetermined bit pattern, such as all zeros. The purpose of steps a) and b) are to test whether the elimination of the sector basically has a significant adverse impact on communication between the mobile station and the remaining sectors in the active set. Such adverse impact can be determined in a variety of ways and no particular method or technique for determining of an adverse impact is necessary or required. Several possibilities are disclosed herein, such as whether the cessation of transmission results in requests for the remaining sectors to increase their power level beyond a threshold.

Based on whether a significant adverse impact is detected in step b), step c) basically either restores communication in the sector, or removes the sector from the active set. The removal can be accomplished by sending an HDM message to the mobile station providing a new active set member list which drops or removes the sector tested in steps a) and b).

The test method described above can be applied to more than one sector in an active set. In one embodiment, the test method is applied to all the sectors in the active set. Obviously, at least one sector in the active set must remain intact, so if the mobile station only has one sector in its active set the test is not conducted of that sector.

In the event that a sector has been removed from the active set but the mobile again requests that the removed sector be added as a member of the active set, such request to add the sector can be handled in several ways. In one embodiment, the request is denied automatically. In another embodiment, the request is denied if it is determined that the mobile station is essentially stationary and has not moved in the interim, and the request is granted if it determined that the mobile station is moving or has moved in the interim.

In another aspect, the method described above can be coded as a series of machine-readable instructions (software) for execution by a processing element (e.g., general purpose computer) provided in a wireless communication system. The processing element could be present in a base transceiver station, mobile switching center, base station controller or other platform. In this aspect, an improvement to a system of one or more base transceiver stations for communication with a mobile station via an active set of cell sectors is provided. The improvement comprises a processing element and a memory storing machine readable instructions for execution by the processing element, the instructions for causing:

a) one of the base transceiver stations to intentionally eliminate communication with the mobile station on a selected sector in an active set;

b) a determination of the effect of the elimination in a) on communication between the mobile station and at least one other remaining sector in the active set; and c) either a restoration of communication on the selected sector or a removal of the selected sector from the active set based on the determination in b).

In addition to the exemplary aspects and embodiments described above, further aspects and embodiments will become apparent by reference to the drawings and by study of the following detailed description.

BRIEF DESCRIPTION OF THE DRAWINGS

Presently preferred embodiments are illustrated in referenced figures of the drawings. It is intended that the embodiments and figures disclosed herein are to be considered illustrative rather than restrictive.

FIG. 9 is an example of a history of log or instances where a sector has been removed from an active set using the procedure of FIG. 4.

FIG. 10 is an illustration of a table correlating sectors which can be removed for mobile stations with geographic boundaries, which can be derived from a log such as shown in FIG. 9.

DETAILED DESCRIPTION OF PREFERRED EMBODIMENT

Figure 1:
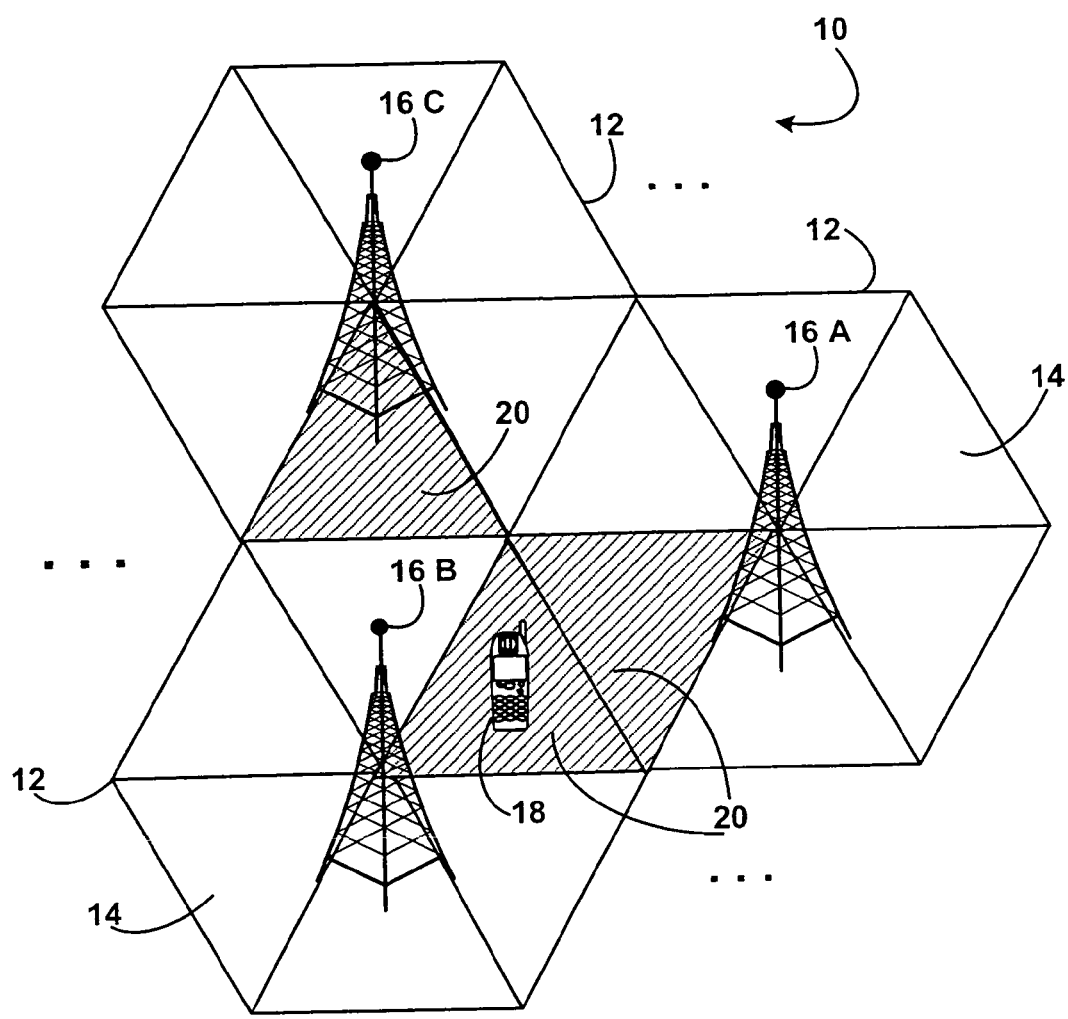
FIG. 1 is a schematic illustration of a mobile station operating in a cellular wireless network in which certain cell sectors, shown shaded, comprise sectors making up an active set of cell sectors communicating with the mobile station.

FIG. 1 is a schematic illustration of a cellular wireless network 10 comprised of a plurality of cells 12, each cell 12 consisting of a number of cell sectors 14. Each cell includes a base transceiver station antenna 16A, 16B, 16C, which communicates over an RF interface with a mobile station 18, e.g. cellular telephone. The cellular wireless network 10 may for example consist of a CDMA 2000 "1x" cellular network, of which those skilled in the art are familiar.

The mobile station 18 maintains a list known as an "active set", which is a list of sectors 14 which communicate with the mobile station. In the example of FIG. 1, there are three sectors in the active set, sectors 20 shown in shaded lines. These sectors 20 are typically, but not necessarily, the sectors whose area coverage overlap the location of the wireless device, or are closest to the location of the wireless device.

Figure 2:
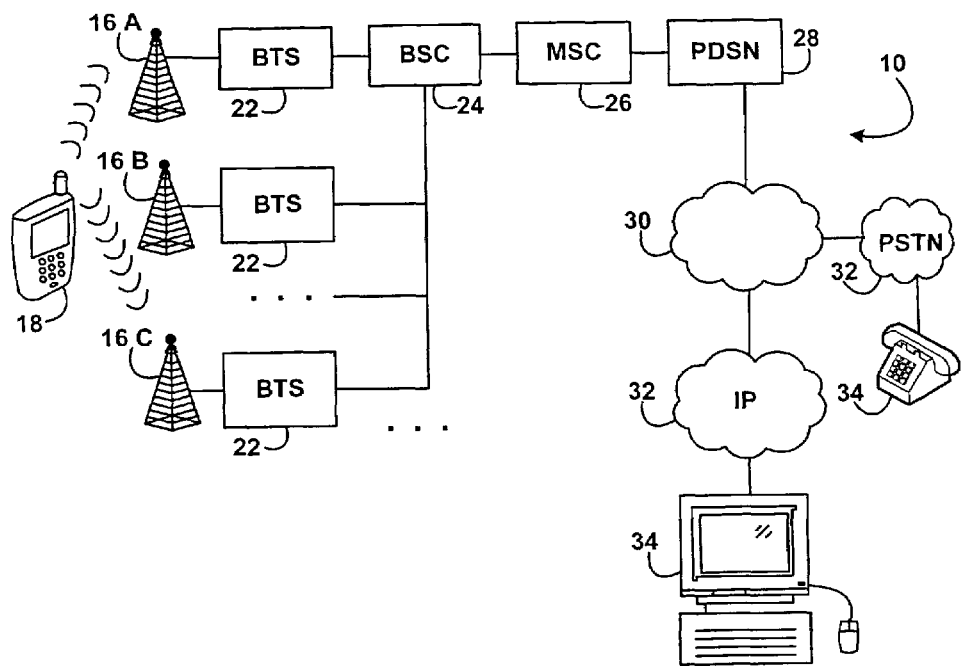
FIG. 2 is a block diagram showing the cellular wireless network infrastructure of FIG. 1 in more detail.

FIG. 2 is a block diagram showing the cellular wireless network 10 infrastructure of FIG. 1 in more detail. The base station antennae 16 are coupled to a base transceiver station 22. Each base transceiver station is coupled to a base station controller 24, which is coupled to a mobile switching center 26. The mobile switching center 26 is coupled to a packet data serving node 28 which functions as a gateway to a packet switched network 30 of a wireless service provider enterprise network. The network 30 is coupled to the public switched telephone network 32 in order to allow the cellular phone 18 to engage in telephone communication with a land-line phone 34. The network 30 is coupled via routers to intermediate packet switched networks such as the Internet 32, and allows the user of the cell phone 18 to exchange data with a network server 34, e.g., Web server or email server.

Figure 3:
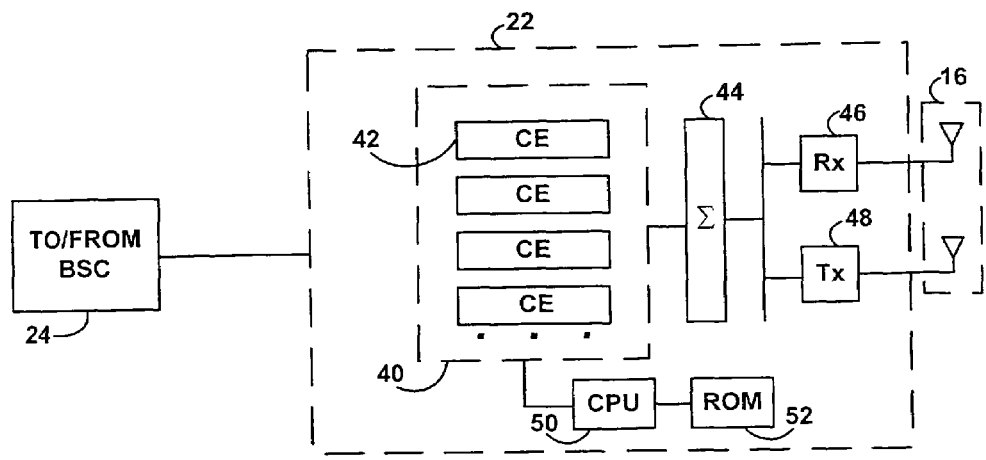
FIG. 3 is a simplified illustration of a base transceiver station in the network of FIG. 2.

FIG. 3 is a simplified illustration of a base transceiver station 22 in the network of FIG. 2. The base transceiver station includes one or more channel element cards which include a multitude of individual channel elements (CE) 42. For communications in the forward direction, the channel elements perform signal modulation, convolution encoding, scrambling, multiplexing, Walsh coding, PN offset encoding and other functions to telephone signals in known fashion. (See, e.g., "Course 132 Technical Introduction to CDMA, *IS-95 CDMA and a few details of CDMA* 2000 *1X*", Scott Baxter (2003), available at www.howcdmaworks.com.)

The outputs from the channel elements are summed in a summing element 44 and supplied to transmit element 48 and supplied to base transceiver antenna 16. One channel element 42 is assigned to one active set sector for a given mobile station operating in the area served by the base transceiver station. In the reverse direction, RF signals are received by the antenna and supplied to a receive element 46, where they are provided to a channel element 42 (typically a different one for the reverse direction) for processing essentially in the reverse manner of the forward direction to uncover voice or data signals from the mobile station. The BTS 22 further includes a central processing unit 50 and a memory 52 storing software instructions for execution by the CPU for performing the methods described herein.

As noted above, a given mobile station may have three or more sectors in its active set. The present inventor has recognized that in many situations communications between the base transceiver station(s) and the mobile station can be perfectly satisfactory with a lesser number of sectors in the active set, thereby freeing up channel elements and other soft handoff resources such as Walsh Codes for use in communication with other mobile stations that need them more. Accordingly, in one aspect of this disclosure, the base transceiver station proactively tests whether it can remove a sector from a mobile station's active set. Such proactive testing is implemented as a method which includes a step a) of intentionally eliminating communication between a base transceiver station and the mobile station on a selected sector in the active set; and a step b) of determining the effect of the elimination on communication between the mobile station and at least one other remaining sector in the active set.

Step a) may be performed by simply ceasing transmission in the selected sector. Alternatively, it may be performed by continuing to transmit on the sector a predetermined bit pattern, such as all zeros.

The purpose of steps a) and b) are to test whether the elimination of the sector basically has a significant adverse impact on communication between the mobile station and the remaining sectors in the active set. Such adverse impact can be determined in a variety of ways described below and no particular method or technique for determining of an adverse impact is necessary or required. If the elimination of communication in step (a) does not produce a significantly adverse impact (either no impact, or minimal impact), then the base transceiver station removes the sector from the active set. This can be performed for example by sending the mobile station an HDM message in which a new active set is sent to the mobile station with the selected sector tested in steps (a) and (b) removed. On the other hand, if the elimination of selected sector has a significant impact, such as by requiring the mobile station to transmit at a substantially higher power level on the remaining active set sectors, or requiring the remaining sectors to transmit at power levels exceeding a threshold, then the selected sector is added back to the active set (e.g., communication restored on the selected sector, with or without sending a new HDM message).

Thus, for instance, if a mobile station has three sectors in its active set, this process can result in removing one of those sectors so that the mobile station has only two sectors. Reducing the number of sectors in a mobile station's active set will result in better use of RF air interface resources, since there would then be less traffic on the removed sector. The reducing in number of active set sectors also frees up soft hand-off resources such as channel elements and Walsh Codes for use in communicating with other mobile stations. Obviously, at least one sector must remain in the active set and if the mobile station has only one sector in its active set the testing described herein is not performed.

As the base transceiver station removes a sector from the active set, the chances are, in theory, that the power required to communicate with the mobile station will increase on all sectors remaining in the mobile station's active set. This is a potentially negative consequence, because higher power communication can interfere with other mobile stations operating in the area. However, it is believed that the freeing up and more optimal utilization of expensive channel elements outweighs this theoretical drawback.

The base transceiver station can conduct the elimination test independently on channel elements assigned to the forward link and to the reverse link.

The determination of whether a significant adverse effect occurs when transmission is eliminated (step b) can be performed in a variety of manners. Such determination can be performed as a software operation executing in the base transceiver station or in another element of a wireless network, such as a base station controller or mobile switching center.

One way to make this determination is to determine if the forward link transmission power requested by the mobile station increases by a threshold amount (e.g., 5%) over a test time period, such as over the course of a threshold number of frames. In this regard, as noted above, as part of the normal power control process, the mobile station may send "power up" and "power down" commands on the reverse traffic channel to the base transceiver station, and the base transceiver station responsively increments or decrements the forward link transmission power in predefined power steps.

Another way to make this determination is to determine if the base transceiver station receives a certain number (N) of consecutive power-up commands from the mobile station, where N is a predetermined integer greater than or equal to 2. For example, if N is 5, and the base transceiver station receives 6 consecutive power up commands (without getting any power-down commands from the mobile station), then it may be deemed that the power levels requested are too high and a significant adverse impact is deemed to occur.

Still another way to make this determination is to determine if the forward link power to the mobile station on the remaining active set members hits a threshold high level. In this regard, the power control algorithm applied by a base station controller normally has a "maximum" power threshold, such as 500 mWatts for instance, such that if the forward link power to a mobile station needs to increase beyond the maximum threshold (500 mWatts), the base station controller would instead drop the call. In one embodiment, a threshold high power level to use can be selected based on the average forward link power generally observed to be used by mobile stations. The threshold high power level would preferably be less than the base station controller's maximum allowable power level (500 mWatts in this example), so as to leave more power for use by other mobile stations. For example, if the base station controller maximum power is 500 mWatts, then the threshold can be set at 250 mWatts. Other examples are possible as well.

Note that if this invention is applied in an area where the base station antenna is nearby mobile stations (such as in a private wireless system, e.g., a distributed antenna system in a building), the forward link power required by most mobile stations will be quite low. In that situation, the only real limitation would be the number of available channel elements, not the extent of available power. Consequently, in that situation, one might select a higher power threshold for use in determining whether a significant adverse impact has occurred. On the other hand, if the base station antenna is relatively far from the mobile stations, more forward link power would typically be required, so it would be advisable to preserve the forward link power and thus one would want to use a lower power threshold for testing whether a significant adverse impact has occurred.

Once the base transceiver station determines from step (b) that no significant impact has occurred and it can remove the sector from the mobile station's active set, the base transceiver station sends an HDM message to the mobile station, providing the mobile station with a new active set that does not include the removed sector.

Selecting which Sector in a Mobile Station's Active Set

The method of this disclosure includes the step a) of eliminating communication on a selected sector in a mobile station's active set. There are several possible methods by which a selection is made of a sector in a mobile station's active set which should be tested for potential elimination. The base transceiver station can apply any of the following processes to select a sector:

1. The base station can cycle through the sectors in the mobile station's active set and apply the test to each sector, one at a time.
2. The base station can apply the test to the sector that has the lowest reported mobile station receive power level (ratio $E_c/I_o$). Or,
3. On the reverse link, the base transceiver station can consider how often the base transceiver station needs/uses each sector in the reverse link (similar to determining how often the mobile station needs/uses each sector leg on the forward link). If the base station determines that it does not need a particular sector that often (a configurable parameter), then the base station can apply the forward link test with respect to that particular sector.

Consideration of Stationary/Mobile Nature of Mobile Station

Note that a mobile station will continue to receive pilot signals of sectors in its active set, even if the mobile station and base transceiver station are not engaging in communication on the sectors. Further, when a base transceiver station removes a sector from the mobile station's active set, presumably the removed sector would remain in the mobile station's neighbor set, so the mobile station would continue to monitor the pilot power level of the removed sector.

It many situations, the pilot signal strength of the removed sector will likely continue to be above the $T_{ADD}$ threshold. Consequently, it is likely (or at least possible) that the mobile station will keep asking to add that removed sector back into its active set (e.g., by sending PSMM messages to the base transceiver station).

To deal with this scenario, there are several possible methods that can be used. Firstly, the base transceiver station could simply deny the requests.

Secondly, and more preferably, the base transceiver station can determine (either directly or by use of intermediate processing elements in a wireless network) if the mobile station is stationary or moving. In this regard, the test for moving can be implemented by determining if the mobile station has moved by a substantial amount (configurable parameter, e.g., 100 meters) between the time the sector was removed and the time the PSMM message was received seeking to add the sector back into the active set. If the mobile station is essentially stationary (no substantial movement), then it would be reasonable to assume that the mobile station's RF conditions are not changing substantially. Consequently, the base transceiver station refuses the request to add the sector back into the mobile station's active set. On the other hand, if the mobile station is moving (substantial movement has occurred), then it would be more possible that the mobile station's RF conditions are in fact changing, and so the request to add the sector back into the mobile station's active set is granted. As noted above, the process of testing active set members can be repeated for other sectors (or all the sectors in the active set) and a different sector (or sectors) removed using the method.

The base transceiver station can determine whether substantial movement has occurred by determining if the round trip delay (RTD) of signals communicated between the base transceiver station and the mobile station changes sufficiently over time. RTD may normally be monitored by a base transceiver station in any event. So the base station can determine whether substantial movement has occurred by determining whether the RTD changes by more than some threshold amount over time.

Alternatively, the base transceiver station can determine whether substantial movement has occurred by considering the GPS location of the mobile station over time, to see if the GPS location changes sufficiently over time. During the test period, the base station can periodically send a "position determination request message" to the mobile station asking the mobile station to report its GPS location, and the mobile station would query a GPS receiver to determine its GPS location and respond with a "position determination response message" to the base station. These messages are defined by industry standard IS-801. Obviously, this approach assumes that the mobile station has a GPS receiver and such devices are now being deployed, so use of GPS location has some applicability now and more is expected in the future.

As a further alternative, the base transceiver station can determine whether substantial movement has occurred by considering whether the location of the mobile station has changed sufficiently over time, with location being determined through well known triangulation mechanisms, e.g., using round trip delay or other measurements from three or more base transceiver station antennas.

Note that these various mechanisms might have different accuracy levels, so the thresholds for substantial movement triggering granting a request to add the removed sector back to the active set might differ from one mechanism to another.

In another aspect, the method described above can be coded as a series of machine-readable instructions (software) for execution by a processing element (e.g., general purpose computer) provided in a wireless communication system. The processing element could be present in a base transceiver station, mobile switching center, base station controller or other platform.

Figure 4:
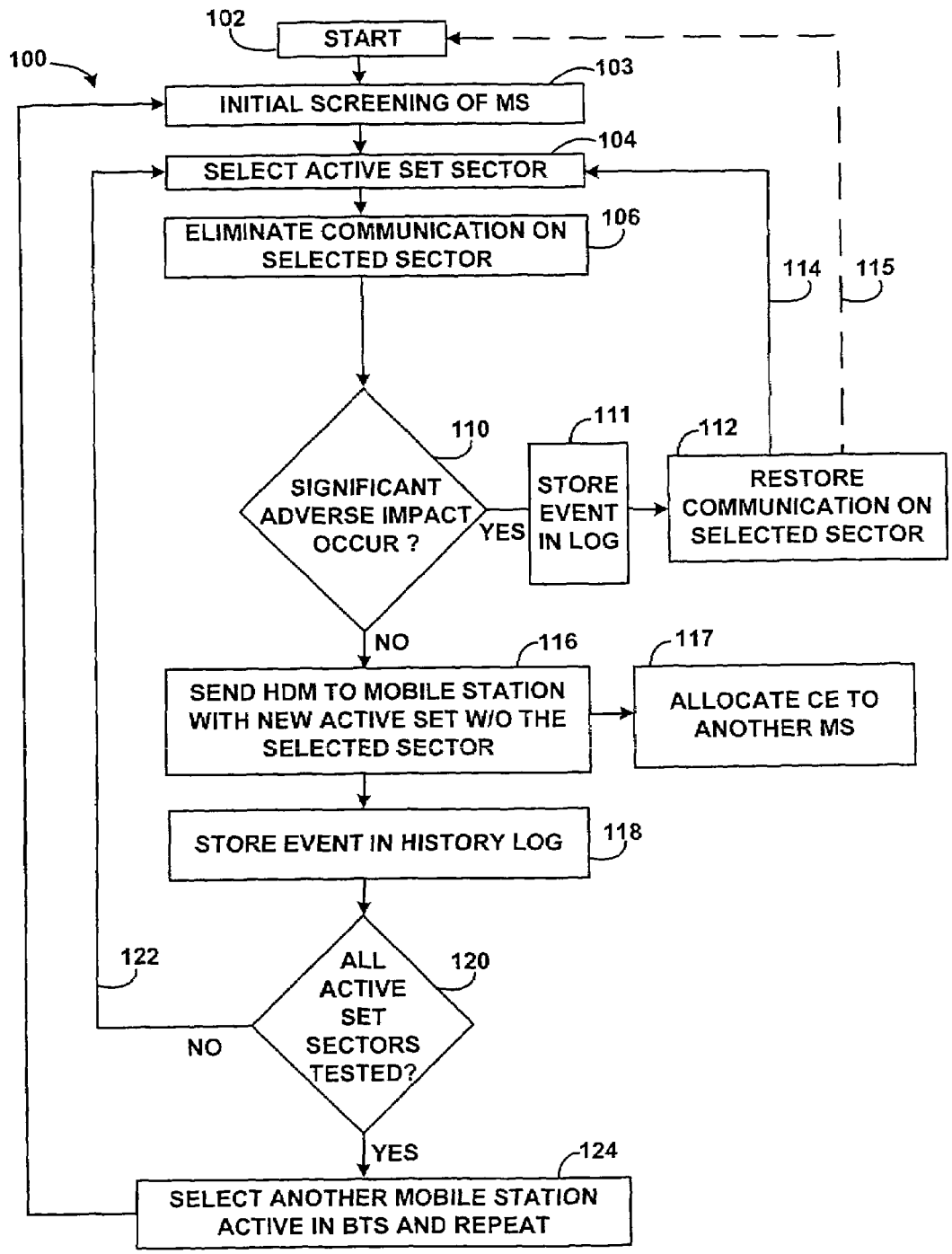
FIG. 4 is a flow chart showing a method of testing and removing a sector (and associated channel element) from an active set serving a mobile station. The method of FIG. 4 is preferably implemented as a set of software instructions executing in a computing platform in the network of FIG. 2, such as for example in a base station controller or base transceiver station.

FIG. 4 is a flow chart showing a method 100 of testing and removing a sector (and associated channel element) from an active set serving a mobile station. The method 100 of FIG. 4 is preferably implemented as a set of computer instructions in a computing platform in the network of FIG. 2, such as for example in a base station controller 24 or base transceiver station 22.

As shown in FIG. 4, the process starts at step 102. In this step, a particular mobile station operating in the area served by a base transceiver station is selected. The active set for the selected mobile station is obtained, e.g., from a memory in the base station controller 24.

At step 103, an initial screening of the selected mobile station is performed to determine whether it is a good candidate for the test procedure which follows. This initial screening may involve the step of reviewing data for all the sectors that the mobile station is communicating with to determine if one or more of the parameters associated with the communication indicates that the call might be dropped in the test was conducted. Obviously, one would not want to conduct the test if there is a significant chance that it could result in a dropped call. The parameters to be considered could be the ratio of $E_c/I_o$ on each of the sectors, the round trip delay time in each sector (which could indicate that the device was a long way off from one or more antennas, indicating a likelihood of the call being dropped), and the transmit power level at each base transceiver station in that sector. For example, if the power level was already at a maximum value, then one might not want to conduct the test because the sectors would not be able to transmit at increased power levels, which might be expected if the test was conducted. The criterion for determine whether the screening test 103 is passed are user configurable and can be determined by persons skilled in this art. Assuming the selected mobile station passed the initial screening, the process proceeds to step 104.

At step 104, a sector in the mobile station's active set is selected, e.g., using any of the three methods mentioned previously.

At step 106, communication on the selected sector is eliminated, either by ceasing transmission entirely or by transmitting a predetermined bit pattern, such as zeros.

At step 110, a determination is made of the effect of elimination of communication in step 106 and whether a significant adverse effect occurred. Step 110 can be determined on the basis of observing the communications between the mobile station and the remaining sectors in the active set, such as the history of power level requests and power output at the remaining sectors, or the frame error rates on the remaining sectors. Several alternative approaches for performing step 110 are illustrated in FIGS. 6, 7, 8 and 8A.

If the determination at step 110 was that a significant adverse effect occurred, the processing proceeds to step 111 of storing the event in an event log or history (basically all the relevant information about the device, its location, the sector tested and the result of the test, see FIG. 9) and then to step 112 wherein communication on the selected sector is restored. The process then reverts back to step 114 for testing of another active sector (or as indicated at step 115, testing a different mobile station).

If, at step 110, it was determined that a significant adverse impact did not occur, the process proceeds to step 116. An HDM message is sent to the mobile station with a new active set without the selected sector tested in step 110. At step 117, the channel element and Walsh code for the selected sector is released and made available for use with communications with other mobile stations served by the base transceiver station.

At step 118, the removal of the sector is stored in the event log (FIG. 9). The event log forms a history of successful removals of sectors from active sets. Such history can be used to facilitate removal of sectors in the future, e.g., based on the geographic location of the mobile station.

At step 120, a test is made of whether all the sectors in the active set of the mobile station have been tested. If not, the process loops back to step 104 and the selection of a new sector. If so, then another mobile station served by the base transceiver station is selected in step 124 and the process loops back to step 104 for the newly selected mobile station.

Figure 5:
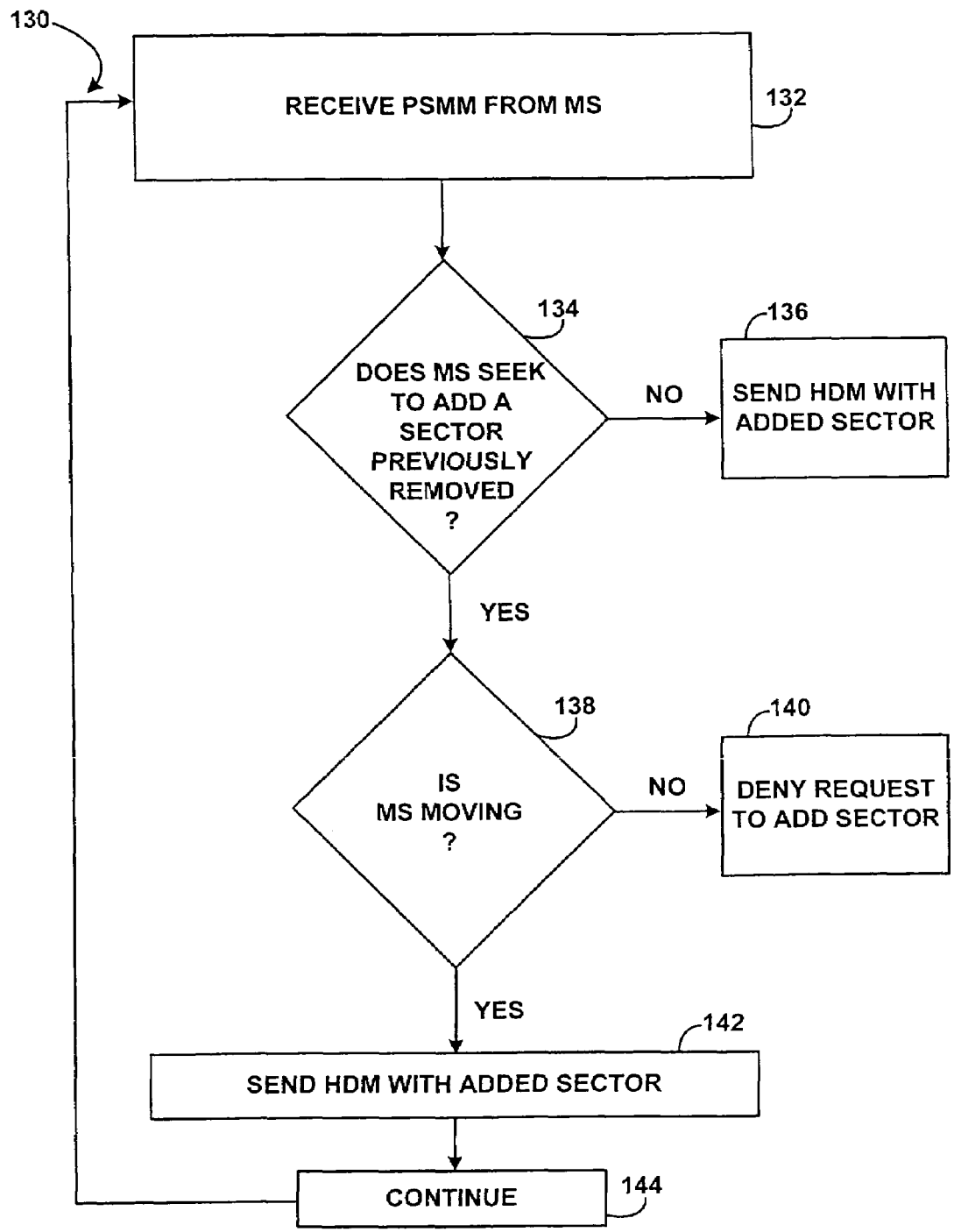
FIG. 5 is a flow chart showing a method of responding to a PSMM message from a mobile station after a sector has been removed using the procedure of FIG. 4.

FIG. 5 is a flow chart showing a method 132 of responding to a PSMM message from a mobile station after a sector has been removed using the procedure of FIG. 4. The PSMM message is a message reporting on pilot signal strength measurements made by the mobile station and is used by a base station controller to provide a new active set for a mobile station. As noted previously, the mobile station may attempt to add a sector that has been previously eliminated using the method of FIG. 4. To avoid an endless loop of dropping and adding a sector, the method preferably includes a step 132 of receiving the PSMM message, and a step 134 of determining whether the mobile station is seeking to add a sector that was previously removed using the method of FIG. 4. If not, the base transceiver station sends an HDM message to the mobile station adding the sector. However, if at step 134 the mobile station is seeking to add a sector that has previously been removed using the procedure of FIG. 4, the processing proceeds to a step 138 of determining whether the mobile station is moving (i.e., has moved substantially (e.g., by 100 meters)) from the position it was when the sector was removed and at the time the PSMM message was received. Step 138 can be performed using the methods described previously, e.g. using RTD measurements or GPS data.

If at step 138 the mobile station has not moved substantially or is not moving, the processing proceeds to step 140 and transmission of a message basically denying the request to add the removed sector. Conversely, if the device is moving, an HDM message is sent to the mobile station adding the sector back into the active set, as indicated at step 142. The process continues as indicated 144, e.g., waiting to receive another PSMM message, and if so the process of FIG. 5 repeats.

Figure 6:
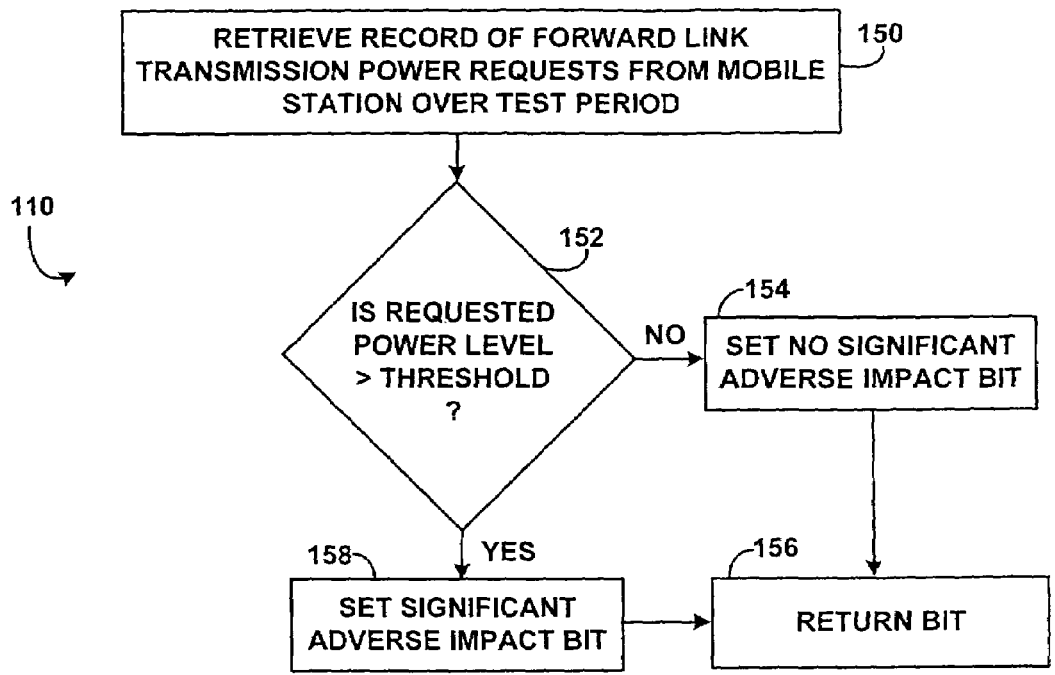
FIG. 6 is a flow chart showing a method of determining whether a cessation of transmission of communication in a sector in accordance with the method of FIG. 4 results in a significant adverse impact such that the sector should be restored to active communication, or conversely, whether no adverse impact has occurred and the sector can be removed from the active set.

FIG. 6 is a flow chart showing a method of determining whether a cessation of transmission of communication in a sector in accordance with the method of FIG. 4 results in a significant adverse impact such that the sector should be restored to active communication, or conversely whether no adverse impact has occurred and the sector can be removed from the active set. FIG. 6 implements step 110 of FIG. 4. FIG. 6 can be applied to one particular remaining sector in the active set, or to all of the remaining sectors.

At step 150, the processing retrieves a record of the forward link transmission power requests from the mobile station over a test time period after communication was eliminated in FIG. 4, step 106. The test time period could be defined in terms of time, number of frames, or other criterion. At step 152, the processing calls a subroutine which determines whether the requested forward link power level on the tested sector exceeds a threshold (configurable parameter). If no, at step 154, a bit or flag is set indicating that no significant impact has occurred and at step 156 the bit or flag is returned to the main processing routine step 110. If yes, a significant adverse impact bit or flag is set and the bit is returned to the main processing routine indicating that a significant adverse impact has occurred. The processing can be repeated for other remaining sectors in the active set so as to test all of them.

Figure 7:
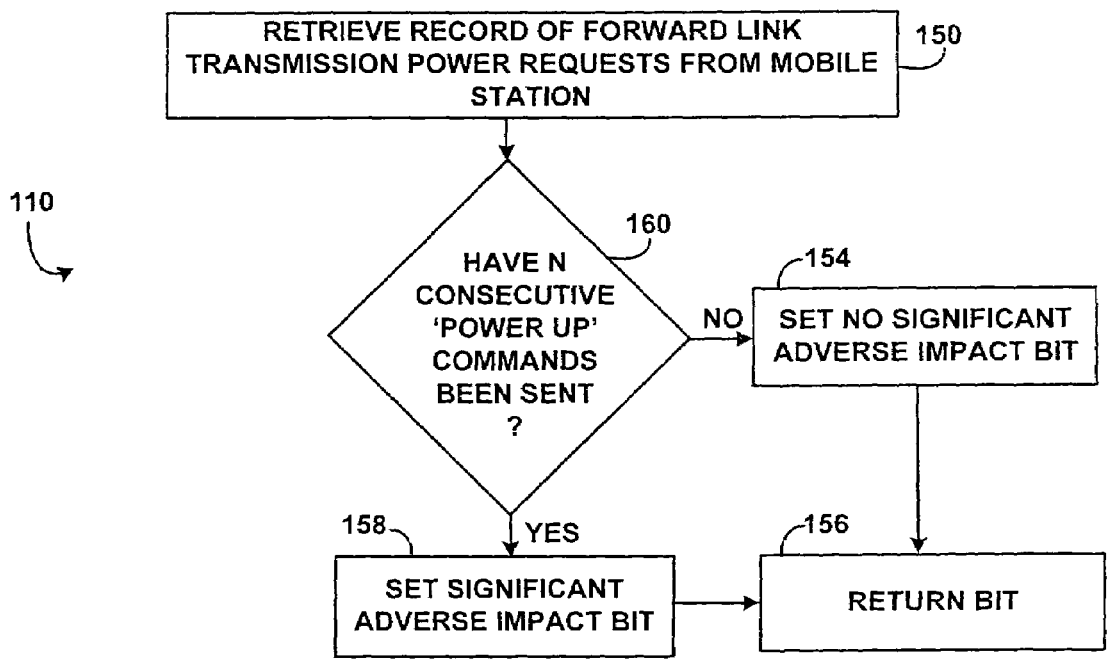
FIG. 7 is a flow chart showing an alternative method for determining whether a cessation of transmission of communication in a sector in accordance with the method of FIG. 4 results in a significant adverse impact.

FIG. 7 is a flow chart showing an alternative method for determining whether a cessation of transmission of communication in a sector in accordance with the method of FIG. 4 results in a significant adverse impact. Step 150 is the same as for FIG. 6. At step 160, a subroutine is called which determines from the record retrieved at step 150 whether N consecutive "power up" commands have been sent by the mobile station, without any "power down" requests. N is a predetermined integer greater than 2. N can vary from sector to sector.

The processing of FIG. 7 can be repeated for each of the remaining sectors in the active set. Steps 154, 156 and 158 are the same as for FIG. 6.

Figure 8:
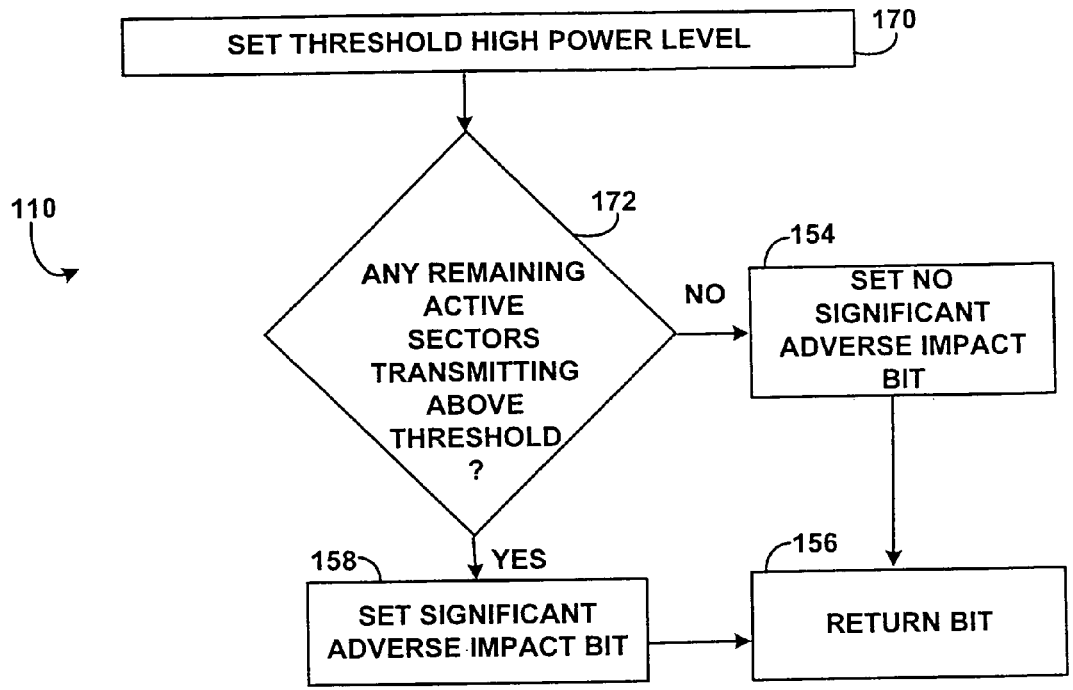
FIG. 8 is a flow chart showing yet another alternative method for determining whether a cessation of transmission of communication in a sector in accordance with the method of FIG. 4 results in a significant adverse impact.

FIG. 8 is a flow chart showing yet another alternative method for determining whether a cessation of transmission of communication in a sector in accordance with the method of FIG. 4 results in a significant adverse impact. The method of FIG. 8 includes a step 170 of setting a threshold high power level for the sector which is being tested in this procedure. As noted above, the power control algorithm applied by a base station controller normally has a "maximum" power threshold, such as 500 mWatts for instance, such that if the forward link power to a mobile station needs to increase beyond the maximum threshold (500 mWatts), the base station controller would instead drop the call. In the procedure of FIG. 8, a threshold high power level to use can be selected based on the average forward link power generally observed to be used by mobile stations. The threshold high power level would preferably be less than the base station controller's maximum allowable power level (500 mWatts in this example), so as to leave more power for use by other mobile stations. For example, if the base station controller maximum power is 500 mWatts, then the threshold can be set at 250 mWatts. Other examples are possible as well.

At step 172, a determination is made of whether any remaining sectors in the active set are transmitting with the mobile station at a power level above the threshold at the elimination of communication (step 106, FIG. 4) occurred. If not, then no significant impact is occurring and steps 154 and 156 are executed. If at step 172 one or more sectors are transmitting at or above the threshold, then steps 158 and 156 execute.

Figure 8A:
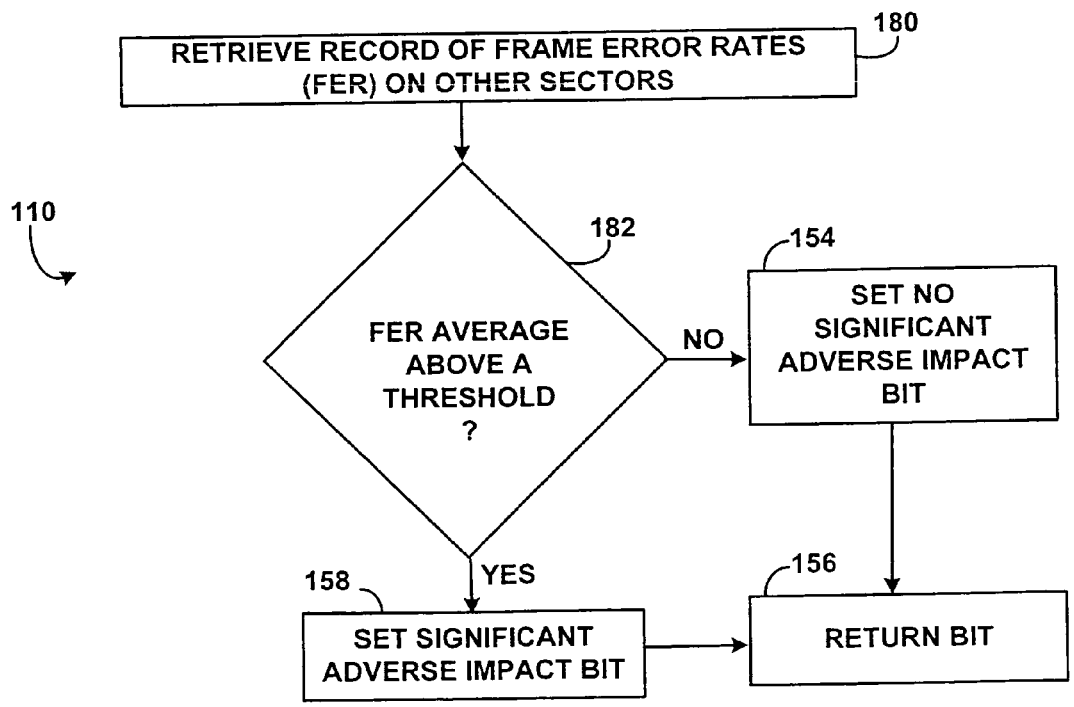
FIG. 8A is a flow chart showing yet another alternative method for determining whether a cessation of transmission of communication in a sector in accordance with the method of FIG. 4 results in a significant adverse impact, this embodiment using frame error rate statistics from remaining sectors in the active set.

FIG. 8A is a flow chart showing yet another alternative method for determining whether a cessation of transmission of communication in a sector in accordance with the method of FIG. 4 results in a significant adverse impact, this embodiment using frame error rate statistics from remaining sectors in the active set. At step 180, the software process retrieves a record of the frame error rates (FER) on the other sectors in the active set after the communication on the sector was eliminated (step 106, FIG. 4). At step 182, a comparison is made of the average frame error rate to a threshold. There are several possible ways of averaging frame error rate and no method is considered especially important to use. If the comparison indicates that the average FER is not greater than the threshold on at least one of the other sectors in the active set, then no significant adverse impact is deemed to have occurred and steps 154 and 156 are performed (same as above). On the other hand, if the average FER on at least one sector is above the threshold, then a significant adverse impact is deemed to have occurred and steps 158 and 156 are performed (same as above.)

Usually, FER statistics are closely correlated with transmit power levels (transmit power level is increased in order to decrease the FER). Hence, the approaches in FIGS. 8 and 8A are somewhat similar. One could conduct the test procedure 110 using FER or transmit power levels, as indicated in the Figures. One could also conduct the test procedure by looking at both parameters, if desired. Furthermore, the FER test of FIG. 8A could be done on either on the basis of (1) the FER for data received by the mobile station and as reported back to the base transceiver station, or (2) the FER for data received from the mobile station, (3) or both.

Referring now to FIG. 9, one possible example is illustrated of a history or log of instances where a sector has been removed from an active set using the procedure of FIG. 4. The entries in the log are made at step 118 of FIG. 4. The log could be stored for example in memory in a base station controller or base transceiver station (memory 52 of FIG. 3). The history basically is a listing of events in which sectors have been removed, and for each event storing pertinent information, including the mobile station ID (which could be phone number or Electronic Serial Number (ESN)), the location of the mobile station at the time the sector was removed, the sector that was removed, the sectors that made up the active set, an array of test results (such as any resulting power increase requests on the other active sectors, frame error rates on the other active sectors, transmit power levels, round trip delay time on remaining sectors, whether the call was dropped, etc.) and the date and time of the event. Additional information could be stored if necessary. The history also stores data for events in which the testing of FIG. 4 resulted in restoration of communication on the tested sector (step 111).

From the data in FIG. 9, particularly when a suitably large number of instances have been recorded (such as hundreds or thousands), it is possible to derive information that can lead to a simplified and streamlined methods for eliminating a sector in an active set, or, conversely, whether a given sector should not be removed from the active set when a mobile station is in a given geographic area. In particular, from the successful tests, one can determine that certain geographic locations (determined as a rectangular or other polygon boundary, center of a circle of radius R, or otherwise) have good coverage from other sectors and that a particular sector can be virtually automatically removed from an active set with a high confidence level that such removal will be without adverse consequences. For example, if the log shows that 50 mobile stations within a three hundred meter radius of a particular location all have had the same sector or sectors removed successfully, using the procedure of FIG. 4, then it is safe to assume that, in the future, when another mobile station moves into that location it need not have the identified sector or sectors in its active set. Conversely, the log may show that on 34 separate occasions in a two day period the tests were done to remove sector S1 from mobile stations' active set when the mobile stations were in a certain geographic area, and it was determined in every instance that such removal adversely affected transmit power levels on the remaining sectors. Accordingly, when the next mobile station is tested in that area, once can assume that from the past history that sector S1 should remain in the active set and one need not bother to test this sector and should instead test another sector.

FIG. 10 shows a table that can be derived from a log such as shown in FIG. 9 that basically correlates geographic locations with sectors that can be removed from an active set. For example, the first entry in the table indicates that within a quadrilateral area of coordinates X1, X2 Y1, Y2, where X indicates latitude and Y indicates longitude, sectors S1, S2 and S3 have been removed from active sets in the past (from the log of FIG. 9) without adverse effect using the procedure of FIG. 4. The second entry in the table indicates that within a radius of three miles of point X1 Y1, sectors S1 and S5 have been removed from active sets without adverse effects. In order to obtain the table of FIG. 10, a sufficiently large log or history should be compiled first. Some criterion may be needed to extrapolate geographic boundary coordinates based on individual point data for mobile stations. Trial and error is one approach. Another approach is to define a polygon area which is inclusive of some set of point data but which no region in the boundary is more than a configurable distance from any of the data points. Other methods are also possible. The table could be augmented to show given geographic areas on the left hand side and on the right hand side sector identifications which should not be removed, based on the log or history of FIG. 9.

Figure 11:
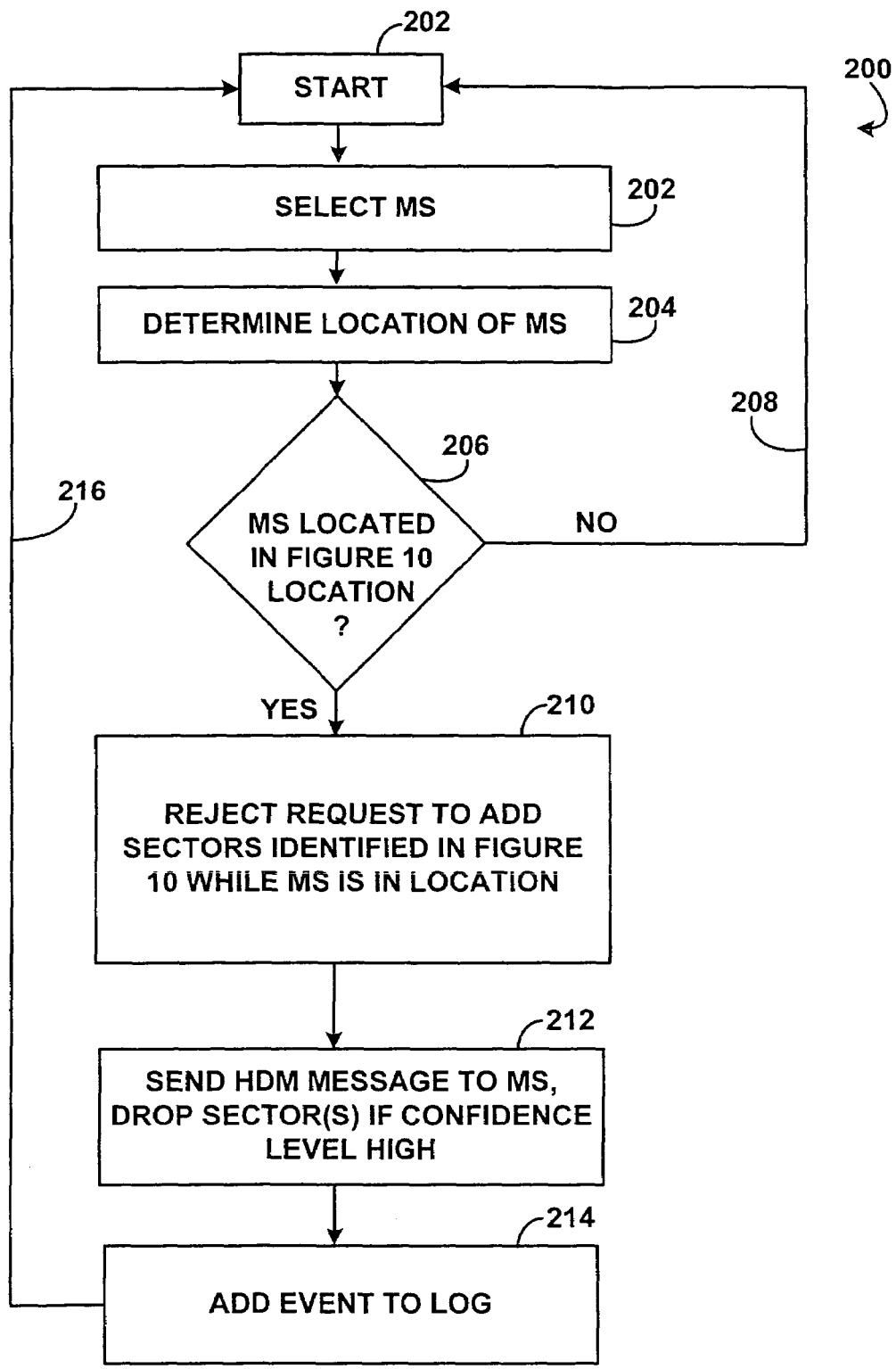
FIG. 11 is a flow chart showing a process of using the table of FIG. 10 to eliminate a sector from an active set, based on location of the mobile station.

FIG. 11 shows a method of using the history of FIG. 9 and the derived table of FIG. 10. At step 202, a mobile station located in an area served by a given base transceiver station is selected. At step 204, the location of the mobile station is determined, e.g., using RTD measurement, triangulation, or GPS location. At step 206, the table of FIG. 10 is queried to determine whether the mobile station is located within any of the geographic areas defined in the left hand side of the table of FIG. 10. If no, the mobile station's active set is left alone and the process loops back to step 202 as shown at 208 and another mobile station is selected. If at step 206 the device is located in one of the regions in the table of FIG. 10, the processing proceeds to step 210. At step 210, the base transceiver station rejects a request to add the identified sector for that location to the mobile station's active set while the device is in the defined location. At step 212, assuming the sector was already in the mobile station's active set (e.g., because the sector was added prior to the device roaming into the defined location), the base transceiver station sends an HDM message that drops the sector from the active set. The step 212 may include consideration of a confidence factor that influences whether to trigger the removal of the sector. The confidence factor could be based on statistics of prior removals of the sector from active sets of other mobile stations, such as the percentage of the time such removal may resulted in unexpected increased power levels, dropped calls, or other factors. The confidence factor could also be based on a confidence level that the mobile station is actually in one of the defined regions in the table of FIG. 10. Some methods of determining mobile station position, such as using round trip delay, are not as precise as using GPS or triangulation calculations from at least 3 base transceiver stations.

At step 214, the event (results of steps 210 or 212) is added to the log or history (FIG. 9). The processing reverts back to step 216 and another mobile station is selected.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

I claim:

1. A method for managing communication between one or more base transceiver stations and a mobile station, said communication occurring on an active set of cell sectors, comprising steps of:
   a) conducting a test at a base transceiver station wherein the base transceiver station intentionally eliminates communication from the base transceiver station to the mobile station on a selected sector in the active set;
   b) determining the effect of the elimination of step a) on communication between the mobile station and at least one other remaining sector in the active set;
   c) either restoring communication on the active set or removing the active set sector from the set of active set sectors, based on the determination in step b); and
   wherein the selected sector for which communication is eliminated in a) comprises the active set sector which has the current lowest reported mobile station received power level; and
   storing a history of removal of active set sectors for a plurality of mobile stations, the removals made using step c).

2. The method of claim 1, wherein step a) comprises the step of ceasing transmission on the selected sector.

3. The method of claim 1, wherein step a) comprises the step of transmitting a predetermined bit pattern on the selected sector.

4. The method of claim 1, wherein the method is performed on a forward link.

5. The method of claim 1, wherein the method is performed on a reverse link.

6. The method of claim 1, wherein step b) comprises the step of determining if a forward link transmit power change is requested by the mobile station which increases forward link transmit power on a remaining sector in the active set above a threshold level over a test time period.

7. The method of claim 1, wherein step b) comprises the step of determining whether the base transceiver station has received N consecutive forward link power change requests for increased power from the mobile station, where N is a predetermined integer greater than or equal to 2.

8. The method of claim 1, wherein step b) comprises the step of determining whether the forward link power to the mobile station on one or more remaining sectors in the active set meets or exceeds a threshold level.

9. The method of claim 1, wherein steps a), b) and c) are applied to more than one sector in the active set.

10. The method of claim 9, wherein steps a), b) and c) are applied to all of the sectors in the active set, one at a time.

11. A method for managing communication between one or more base transceiver stations and a mobile station, said communication occurring on an active set of cell sectors, comprising steps of:
   a) conducting a test at a base transceiver station wherein the base transceiver station intentionally eliminates communication from the base transceiver station to the mobile station on a selected sector in the active set;
   b) determining the effect of the elimination of step a) on communication between the mobile station and at least one other remaining sector in the active set;
   c) either restoring communication on the active set or removing the active set sector from the set of active set sectors, based on the determination in step b);
   wherein the selected sector in step a) is selected based on utilization of active set sectors in a reverse link from the mobile station to the one or
   more base transceiver stations; and
   storing a history of removal of active set sectors for a plurality of mobile stations, the removals made using step c).

12. A method for managing communication between one or more base transceiver stations and a mobile station, said communication occurring on an active set of cell sectors, comprising steps of:
   a) conducting a test at a base transceiver station wherein the base transceiver station intentionally eliminates communication from the base transceiver station to the mobile station on a selected sector in the active set;
   b) determining the effect of the elimination of step a) on communication between the mobile station and at least one other remaining sector in the active set;
   c) either restoring communication on the active set or removing the active set sector from the set of active set sectors, based on the determination in step b); and
   storing a history of removal of active set sectors for a plurality of mobile stations, the removals made using step c).

13. A method for managing communication between one or more base transceiver stations and a mobile station, said communication occurring on an active set of cell sectors, comprising steps of:
   a) conducting a test at a base transceiver station wherein the base transceiver station intentionally eliminates communication from the base transceiver station to the mobile station on a selected sector in the active set;
   b) determining the effect of the elimination of step a) on communication between the mobile station and at least one other remaining sector in the active set;
   c) either restoring communication on the active set or removing the active set sector from the set of active set sectors, based on the determination in step b); and
   receiving a request from a mobile station to add a sector to an active set, wherein the sector requested to be added is one in which communication was previously removed in accordance with step c), and wherein the method further comprises the step of denying the request.

14. The method of claim 13, wherein the request is denied when a determination is made that the mobile station has not substantially moved in the time between the removal of the sector in step (c) and the time the request to add the sector is received.

15. A method for managing communication between one or more base transceiver stations and a mobile station, said communication occurring on an active set of cell sectors, comprising steps of:
   a) conducting a test at a base transceiver station wherein the base transceiver station intentionally eliminates communication from the base transceiver station to the mobile station on a selected sector in the active set;
   b) determining the effect of the elimination of step a) on communication between the mobile station and at least one other remaining sector in the active set;
   c) either restoring communication on the active set or removing the active set sector from the set of active set sectors, based on the determination in step b); and
   receiving a request from a mobile station to add a sector to an active set, wherein the sector requested to be added is one in which communication was previously removed in accordance with step c), and wherein the method further comprises the step of granting the request, and wherein the request is granted based on a determination that the mobile station has substantially moved in the time between the removal of the sector in step (c) and the time the request to add the sector is received.

16. In a system of one or more base transceiver stations for communication with a mobile station via a set of active set sectors, comprising steps of:
   a processing element and a memory storing machine readable instructions for execution by the processing element, the instructions for causing:
   a) one of the base transceiver stations to conduct a test wherein the base transceiver station intentionally eliminates communication with the mobile station on a selected sector in an active set of sectors;
   b) a determination of the effect of the elimination in a) on communication between the mobile station and at least one other remaining sector in the active set; and
   c) either a restoration of communication on the selected sector or a removal of the selected sector from the active set based on the determination in b); wherein the system receives a request from a mobile station to add a sector to an active set, wherein the sector requested to be added is one in which communication was removed in accordance with instructions c), and wherein the request is denied.

17. The system of claim 16, wherein the request is denied when a determination is made that the mobile station has not substantially moved in the time between the removal of the sector in accordance with instructions (c) and the time the request to add the sector is received.

18. In a system of one or more base transceiver stations for communication with a mobile station via a set of active set sectors, comprising steps of:

a processing element and a memory storing machine readable instructions for execution by the processing element, the instructions for causing:

a) one of the base transceiver stations to conduct a test wherein the base transceiver station intentionally eliminates communication with the mobile station on a selected sector in an active set of sectors;

b) a determination of the effect of the elimination in a) on communication between the mobile station and at least one other remaining sector in the active set; and c) either a restoration of communication on the selected sector or a removal of the selected sector from the active set based on the determination in b); wherein the system receives a request from a mobile station to add a sector to an active set, wherein the sector requested to be added is one in which communication was removed in accordance with instructions c), and wherein the instructions further cause a granting of the request, and wherein the request is granted when a determination is made that the mobile station has substantially moved in the time between the removal of the sector in accordance with instructions (c) and the time the request to add the sector is received.

* * * * *